H. E. KINNEAR.
BANK CHECK.
APPLICATION FILED MAY 8, 1915.

1,164,198.

Patented Dec. 14, 1915.

Fig. 2

Fig. 1

Inventor
H E. KINNEAR
By Watson E. Coleman
Attorney

UNITED STATES PATENT OFFICE.

HERBERT E. KINNEAR, OF MARION, INDIANA.

BANK-CHECK.

1,164,198.

Specification of Letters Patent.

Patented Dec. 14, 1915.

Application filed May 8, 1915. Serial No. 26,834.

*To all whom it may concern:*

Be it known that I, HERBERT E. KINNEAR, a citizen of the United States, residing at Marion, in the county of Grant and State of Indiana, have invented certain new and useful Improvements in Bank-Checks, of which the following is a specification, reference being had to the accompanying drawings.

This invention relates to an improved bank check, note, bond, or similar instrument of indebtedness, and has for its primary object to provide improved means for preventing fraudulent raising of the amount of the check.

It is another and more specific object of the invention to provide a check upon one face of which is printed or otherwise delineated a plurality of spaces or individual fields each containing a numeral which may be indicative of the amount written upon the face of the check as payable to the designated person or bearer thereof, the field containing the numeral corresponding to the amount of the check being adapted to be punched out or the amount printed therein obliterated in any other suitable manner.

With the above and other objects in view, the invention consists in the improved bank check or note to be hereinafter fully described and subsequently pointed out in the appended claim.

In the accompanying drawing, wherein like reference characters designate corresponding parts, Figure 1 is a back view of a bank check or the like; and Fig. 2 is a front face view thereof.

5 indicates the paper check or note which may be of any suitable size and upon the back of which the intersecting lines running longitudinally and transversely of the check and indicated at 6, are printed. In each of the rectangular fields 7 thus provided upon the back face of the check, a number or numbers, shown at 8, are printed. In the illustrative form of the invention, these numbers read from left to right, longitudinally of the check, and increase in units from 1 to 100, then in multiples of 5 from 100 to 200, and then in multiples of 10 from 200 to 1000. It will be understood, however, that any other desired arrangement of the numbers may be provided.

It is to be noted that the numbers arranged in multiples of 10 are separated transversely relative to the remainder of the numbers to afford a substantially blank space underlying the space on the front of the check in which the amount to be paid is adapted to be written. This arrangement is created so that the amount written on the face of the check will not be obscured by the punch. It is also to be perceived that the back of the check has sufficient space below the last named numbers as to prevent the punch from obscuring or otherwise interfering with the signature on the face of the check.

The front face of the check is provided with the usual printed matter, and upon one end thereof, the phrase "Not good over first punch mark" and the words "See reverse side" are printed. In the use of the check, assuming that the front face has been filled out and the amount called for is $125, the user, by means of a suitable punch, presses out the paper in this field 7, said punch at the same time applying an acid-proof ink to the back face of the check over the numeral thereon. The paper is thus embossed or raised on the face of the check, so that the amount for which the check is payable will be permanently indicated, but without liability of the check being torn or badly mutilated. The erasure of the ink and the return of the check sheet to its normal condition, is also effectually precluded. It will, however, be understood that, if desired, an ordinary punch may be used and the paper in the field entirely punched out and removed. It will be noted that, by the illustrative arrangement of the numbers on the back of the check, sufficient space is left for the writing of indorsements. If desired, the numbers may also be printed upon the face of the check in the margin thereof.

From the foregoing description, taken in connection with the accompanying drawing, the construction, manner of use and several advantages of my invention will be clearly and fully understood. It will be seen that I have provided a very convenient and simple form of check whereby the fraudulent raising of the amount thereof will be rendered impossible.

Having thus fully described my invention, what I desire to claim and secure by Letters Patent is:—

A bank check having a plurality of series of value indications on the back thereof, and arranged in transversely related rows, each of the indications being disposed longitudinally of the check, certain of said series of value indications being separated transversely of the check to afford a space underlying the portion of the face of the check on which the value of the check is written, the back of the check underlying the space on the front of the check for the signature being also free of value indications, the portion of the back of the check intermediate the aforesaid portions of the face of the check being provided with value indications, one of the series of value indications being numbered consecutively from "1" to "100"; a second series being numbered consecutively in the multiple of five from "105" to "200," and a third series being numbered consecutively in the multiple of ten from "210."

In testimony whereof I hereunto affix my signature in the presence of two witnesses.

HERBERT E. KINNEAR.

Witnesses:
G. A. HENRY,
ORMA D. CURVASS.